United States Patent [19] [11] Patent Number: 5,074,167
Yoshimura et al. [45] Date of Patent: Dec. 24, 1991

[54] AUTOMATIC TRANSMISSION

[75] Inventors: Hiroshi Yoshimura; Shinichi Tanaka; Kouzou Ishii, all of Hiroshima, Japan

[73] Assignee: Mazda Motor Corporation, Hiroshima, Japan

[21] Appl. No.: 597,410

[22] Filed: Oct. 15, 1990

[30] Foreign Application Priority Data

Oct. 19, 1989 [JP] Japan ................... 1-273371

[51] Int. Cl.⁵ .............................. B60K 41/06
[52] U.S. Cl. ........................... 74/866; 74/868
[58] Field of Search .................... 74/866, 868

[56] References Cited

U.S. PATENT DOCUMENTS

| 3,621,735 | 11/1971 | Lemieux | 74/753 |
| 3,871,250 | 3/1975 | Miyauchi et al. | 74/869 |
| 3,881,372 | 5/1975 | Miyauchi et al. | 74/867 |
| 4,351,206 | 9/1982 | Lemieux et al. | 74/866 |
| 4,527,448 | 7/1985 | Person et al. | 74/866 X |
| 4,541,308 | 9/1985 | Person et al. | 74/868 |
| 4,628,771 | 12/1986 | Person et al. | 74/868 X |
| 4,843,922 | 7/1989 | Kashihara | 74/867 X |
| 4,850,251 | 7/1989 | Kuwayama et al. | 74/869 X |
| 4,882,952 | 11/1989 | Kashihara et al. | 74/867 |
| 4,919,012 | 4/1990 | Bolz | 74/866 |
| 4,955,256 | 9/1990 | Kashihara et al. | 74/867 X |

OTHER PUBLICATIONS

07/342855 Pending Patent Application Assigned to Mazda Motor Corp., Dated 04-25-89.

Primary Examiner—Leslie A. Braun
Assistant Examiner—William O. Trousdell
Attorney, Agent, or Firm—Fish & Richardson

[57] ABSTRACT

An automatic transmission includes a hydraulic control circuit for developing coupling pressure to the friction coupling member, the hydraulic control circuit having a regulator device for regulating the coupling pressure and a solenoid valve for controlling the regulator device, a hydraulic pressure sensor device for detecting hydraulic pressure in connection with the coupling pressure, an actuator device for actuating the solenoid valve in a range between the opening position and the closing position to change the control amount of the solenoid valve when the vehicle is in a predetermined state, a memory device for storing a characteristic relationship between detected hydraulic pressures and changed control amounts, and a control device for controlling the solenoid valve based on the characteristic relationship so that the regulator device regulates the coupling pressure to a desired value. This automatic transmission compensates a variation in characteristic relationship between the control amount of the solenoid valve and the coupling pressure, and assures more accurate open control.

13 Claims, 4 Drawing Sheets

FIG.1
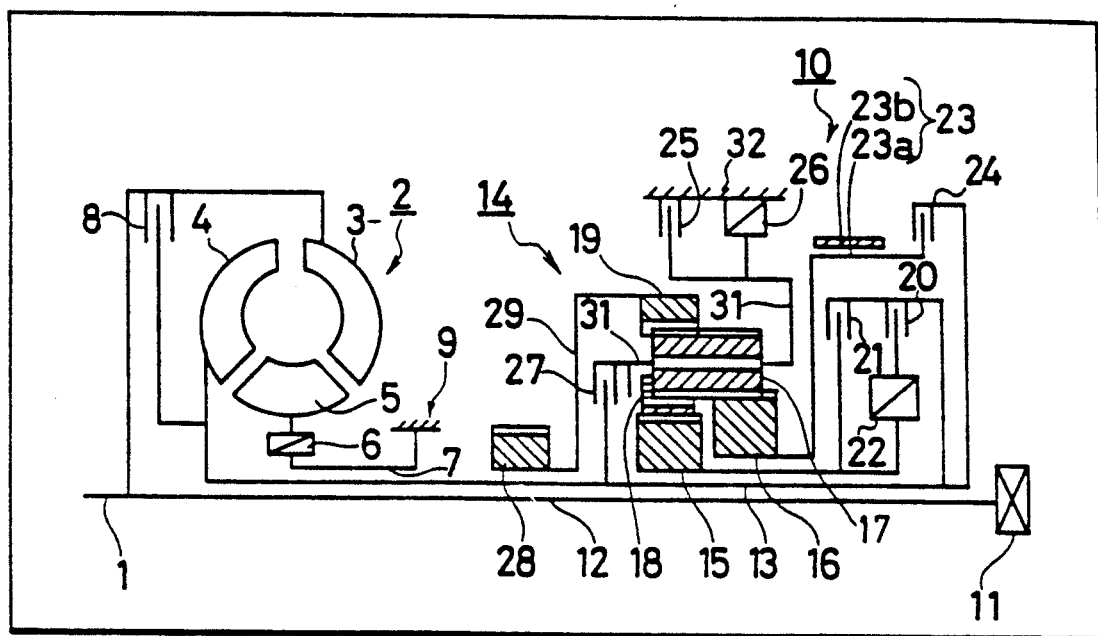
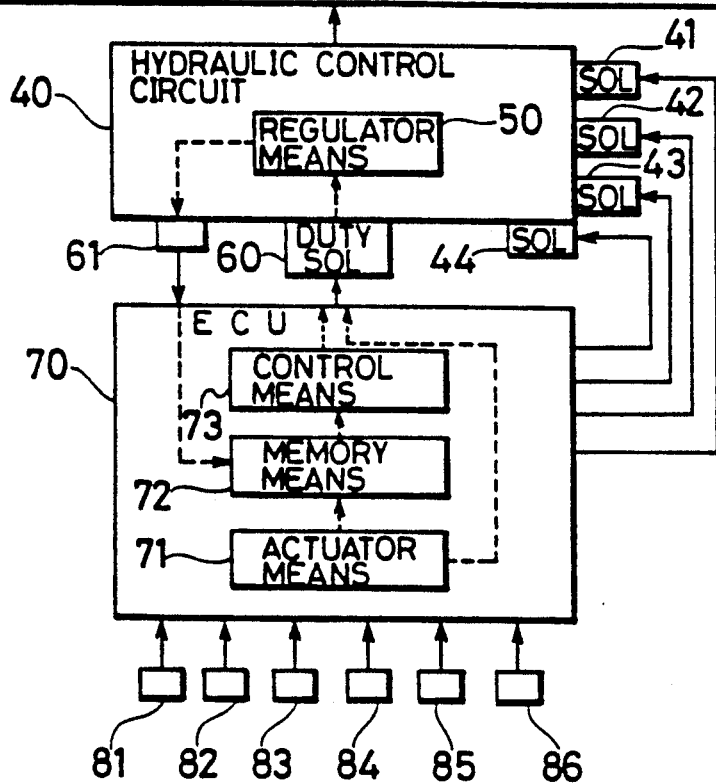

AUTOMATIC TRANSMISSION

BACKGROUND OF THE INVENTION AND RELATED ART STATEMENT

This invention relates to an automatic transmission, particularly to a control system of an automatic transmission for controlling coupling pressure to friction coupling members.

There has been known an automatic transmission comprising a transmission gear mechanism including a planetary gear unit and friction coupling members for shifting the gear ratio, a hydraulic control circuit for developing hydraulic pressure to the respective coupling members, the hydraulic control circuit including regulator means and a duty solenoid valve so that the hydraulic pressure to the respective friction coupling members is controlled by actuating the duty cycle of the duty solenoid valve. For example, Japanese Examined Patent Publication No. 54-2349 discloses such an automatic transmission.

In such an automatic transmission, the coupling pressure to the respective coupling members is controlled by actuating the duty solenoid valve in accordance with the running condition. In controlling the coupling pressure to the friction coupling members by the use of the duty solenoid valve, there have been generally two control manners.

One control manner is a feed-back control. Specifically, with respect to hydraulic pressure in connection with the coupling pressure, a target hydraulic pressure suitable for each of various running conditions is set in advance. An actual hydraulic pressure is detected by use of a hydraulic pressure sensor. The actual hydraulic pressure is compared with the target hydraulic pressure. The solenoid valve is controlled so that the difference between the actual hydraulic pressure and the target hydraulic pressure may become zero. However, the feed-back control is unproper in a state of changing the gear speed which requires rapid response.

The other control manner is an open control. The open control is rapider in response than the feed back control. In the open control, target duty cycles of the solenoid valve which ensure respective suitable coupling pressures for various running conditions are determined and stored in advance, e.g., in the manufacturing stage. When changing the gear speed, the target duty cycle for the present running condition is retrieved and the solenoid valve is then controlled so as to have the target duty cycle. However, there is the following problem in the open control: The performance of the solenoid valve or the like is liable to vary with use over time, which then changes the relationship between the duty cycle and the coupling pressure. Consequently, the coupling pressure cannot be controlled accurately.

SUMMARY OF THE INVENTION

In view of the above-mentioned problems, a main object of the present invention is to provide an automatic transmission which makes it possible to control the coupling pressure with an improved response performance, and further control the coupling pressure with a high accuracy even if the performance of a solenoid valve or the like changes with time.

Accordingly, an automatic transmission of the present invention comprises a transmission mechanism having a friction coupling member, a hydraulic control circuit for developing coupling pressure to the friction coupling member, the hydraulic control circuit having regulator means for regulating the coupling pressure and a solenoid valve for controlling the regulator means, the solenoid valve having an opening position and a closing position, hydraulic pressure sensor means for detecting hydraulic pressure in connection with the coupling pressure, actuator means for actuating the solenoid valve in a range between the opening position and the closing position to change the control amount of the solenoid valve when the vehicle is in a predetermined state, memory means for storing a characteristic relationship between detected hydraulic pressures and changed control amounts, and control means for controlling the solenoid valve based on the characteristic relationship so that the regulator means regulates the coupling pressure to a desired value.

In the automatic transmission, a fresh characteristic relationship between hydraulic pressures and control amounts of the solenoid valve is prepared and stored over the old characteristic relationship each time the vehicle is put in the predetermined state. The solenoid valve is controlled based on the fresh characteristic relationship so that the regulator means develops a desired coupling pressure. Accordingly, the automatic transmission of the present invention can compensate a variation in characteristic relationship between the control amount of the solenoid valve and the coupling pressure, and consequently assure more accurate open control. In other words, the automatic transmission of the present invention makes it possible to attain a desired coupling pressure with higher accuracy and rapider response.

This and other objects, features and advantages of the present invention will become more apparent upon a reading of the following detailed description and drawings.

BRIEF DESCRIPTION OF DRAWINGS

FIG. 1 is a schematic diagram showing an overall construction of an automatic transmission embodying the present invention;

DETAILED DESCRIPTION OF A PREFERRED EMBODIMENT OF THE INVENTION

Figure 2:
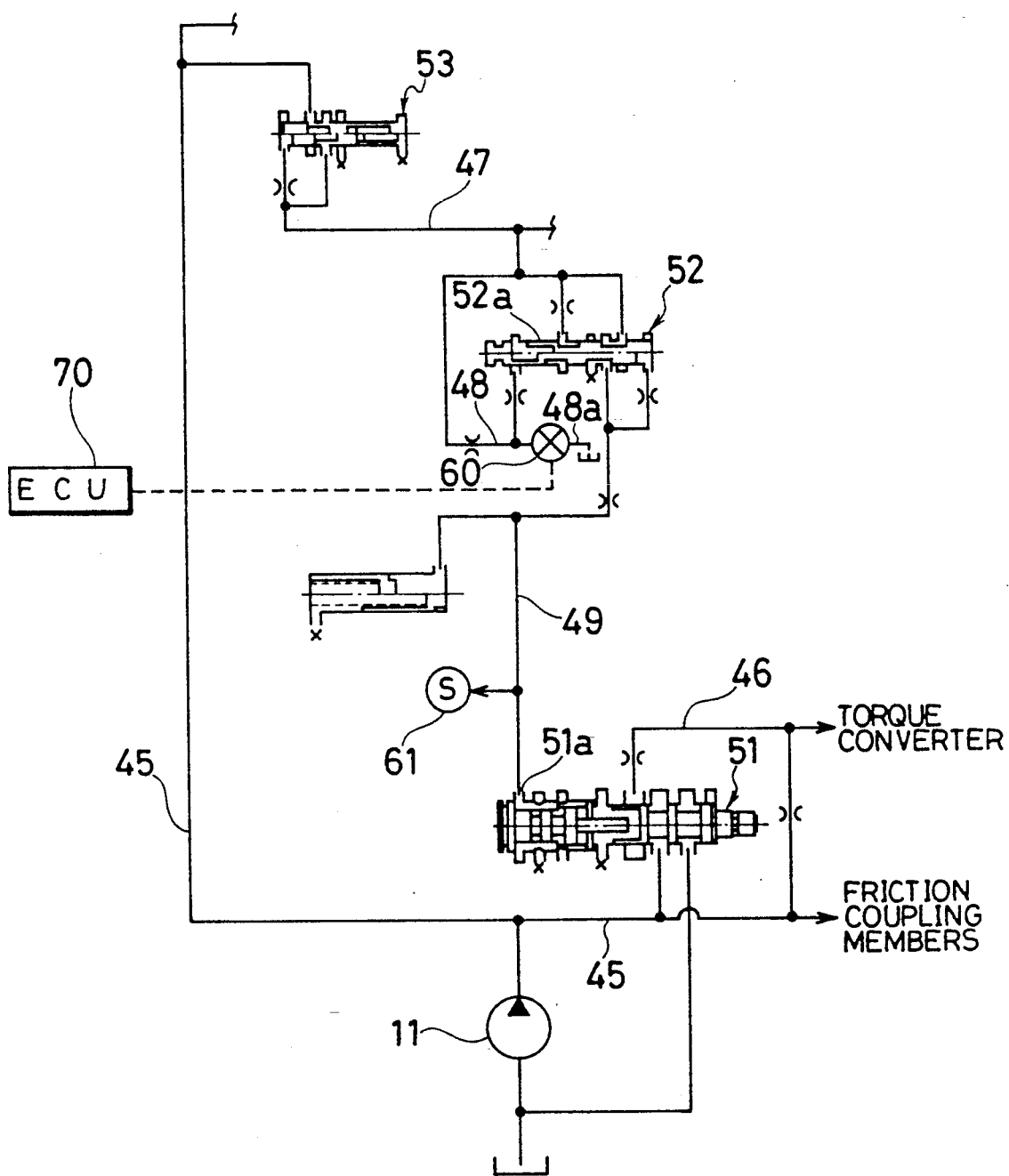
FIG. 2 is a diagram showing a hydraulic control circuit provided in the automatic transmission.

A preferred embodiment of the present invention will be described with reference to drawings. FIG. 1 shows an overall construction of an automatic transmission embodying the present invention. In FIG. 1, indicated at 2 is a torque converter connected to a crankshaft 1 of an engine, and indicated at 10 is a transmission gear mechanism disposed in an output side of the torque converter 2.

The torque converter 2 includes a pump 3, a turbine 4, and a stator 5. The pump 3 is fixedly connected to the crankshaft 1. The turbine 4 is fixedly connected to a turbine shaft 13. The stator 5 is connected to a stationary shaft 7 by way of a one-way clutch 6. The stationary shaft 7 is integrally connected to a transmission casing 9. Also, there is provided a lockup clutch 8 for directly connecting the crankshaft 1 and the turbine shaft 13.

The transmission gear mechanism 10 includes a central shaft 12 for driving an oil pump 11. The central shaft 12 is connected to the crankshaft 1 at one end thereof, and to the oil pump 11 at the other end. The turbine shaft 13, which is connected to the turbine 4 of the torque converter 2 at one end thereof, is in the form of a hollow cylinder. The central shaft 12 is placed in the turbine shaft 13.

A planetary gear unit 14 is mounted on the turbine shaft 13. The planetary gear unit 14 includes a small sun gear 15, a large sun gear 16, a long pinion gear 17, short pinion gears 18, and a ring gear 19.

Further, friction coupling members are provided in the planetary gear unit 14 as follows. A forward clutch 20 and a coast clutch 21 are disposed in parallel in the side of the planetary gear unit 14 which is remoter from the crankshaft 1. The forward clutch 20 and the coast clutch 21 are provided between the turbine shaft 13 and the small sun gear 15 to connect and disconnect the turbine shaft 13 to and from the small sun gear 15. Between the forward clutch 20 and the small sun gear 15 is provided a first one-way clutch 22.

A 2-4 brake 23 is disposed on an outside of the coast clutch 21. The 2-4 brake 23 includes a brake drum 23a connected to the large sun gear 16 and a brake band 23b wrapped around the brake drum 23a. When the 2-4 brake 23 is put into work, the large sun gear 16 is held in a stationary position. A reverse clutch 24 is provided in a side of the 2-4 brake 23 and at a position between the turbine shaft 13 and the large sun gear 16 to connect and disconnect the turbine shaft 13 to and from the large sun gear 16.

A low and reverse brake 25 is provided between a carrier 31 of the planetary gear unit 14 and a casing 32 of the transmission gear unit 10 to connect and disconnect the carrier 31 to and from the casing 32. Also, a second one-way clutch 26 is provided between the carrier 31 and the casing 32 in parallel to the low and reverse brake 25.

A 3-4 clutch 27 is disposed in the other side of the planetary gear unit 14 which is nearer the crankshaft 1. The 3-4 clutch 27 is adopted for connecting and disconnecting the carrier 31 to and from the turbine shaft 13. An output gear 28 is disposed in a side of the 3-4 clutch 27, and connected to the ring gear 19 by way of an output shaft 29.

The transmission gear mechanism 10 has four forward speeds and one reverse speed. A desired speed is obtained by actuating the clutches 20, 21, 24, 27, and the brakes 23, 25 in an appropriate manner. The friction coupling members of the transmission gear mechanism 10, i.e., the clutches 20, 21, 24, 27, and the brakes 23, 25, and the lockup clutch 8 of the torque converter 2 are actuated by hydraulic pressure developed by a hydraulic control circuit 40.

The hydraulic control circuit 40 includes a manual valve for selecting a range, shift valves for applying and releasing hydraulic pressure to and from the respective friction coupling members of the transmission gear mechanism 10 to change the gear speed, and a lockup valve for applying and releasing hydraulic pressure to and from the lockup clutch 8 of the torque converter 2. However, the shift valves and the lockup valve are not shown in the drawing. The shift valves are controlled by solenoid valves 41, 42, 43. The lockup valve is controlled by a solenoid valve 44.

Further, the hydraulic control circuit 40 is provided with regulator means 50 for regulating the hydraulic pressure to the respective friction coupling members to change their coupling pressures, a duty solenoid valve 60 for controlling the regulator means 50, and a hydraulic pressure sensor 61 for detecting the hydraulic pressure in connection with the coupling pressure.

To the hydraulic control circuit 40 is electrically connected an electric control unit (ECU) 70 for controlling the solenoid valves 41, 42, 43, 44, and the duty solenoid valve 60. Also, to the electric control unit 70 are electrically connected the hydraulic pressure sensor 61, a throttle opening sensor 81 for detecting the throttle opening of the engine, a turbine revolution number sensor 82 for detecting the number of revolutions of the turbine 4, an inhibitor switch 83 for detecting a selected range, a switch 84 for detecting that the vehicle speed is zero, a switch 85 for detecting that braking is being effected, and a switch 86 for detecting that the accelerator pedal is suspended.

The electric control unit 70 receives signals from the throttle opening sensor 81 and the turbine revolution number sensor 82, detecting the present running condition of the vehicle, and comparing the present running condition with a predetermined speed change pattern to discriminate whether it is necessary to change the gear speed. When it is discriminated to be necessary to change the gear speed, the electric control unit 70 sends speed change control signals to the solenoid valves 41 to 43 to change the gear speed. Also, depending on the running condition, the electric control unit 70 sends a control signal to the solenoid valve 44 to actuate the lockup clutch 8. Furthermore, the electric control unit 70 sends a control signal to the duty solenoid valve 60 to actuate the regulator means 50 to regulate the hydraulic pressure to the friction coupling members, in other words, to control the coupling pressure to the friction coupling member.

Furthermore, the electric control unit 70 is provided with actuator means 71, memory means 72, and control means 73. The actuator means 71 is adopted for changing the duty cycle of the duty solenoid valve 60 from the full-opening position to the full-closing position when the vehicle is in a predetermined state. The memory means 72 is adopted for storing a characteristic relationship between hydraulic pressures and duty cycles of the duty solenoid valve 60 during the time when the duty solenoid valve 60 is actuated with the vehicle being in the predetermined state. The control means 73 is adopted for determining a duty cycle to develop a target hydraulic pressure based on the characteristic relationship, and sending a control signal to the duty solenoid valve 60 to attain the determined duty cycle. In this embodiment, the actuator means 71 is put into operation when the vehicle is being stopped in a non-running range.

FIG. 2 shows a specific construction of the regulator means 50 of the hydraulic control circuit 40.

In FIG. 2, hydraulic oil is supplied to a main line 45 from an oil pump 11, and permitted to flow to a pressure regulator valve 51 by which the pressure of the main line 45 is regulated. The main line 45 is communicated with the friction coupling members through the manual valve and the shift valves to give a regulated line pressure to the friction coupling members. Accordingly, it will be seen that the regulated line pressure is the coupling pressure to the friction coupling member. Also, the pressure regulator valve 51 is communicated with the torque converter 2 through a converter line 46 provided with the lockup valve, so that a regulated hydraulic pressure is given to the torque converter 2.

Further, with the pressure regulator valve 51 is communicated a modulator valve 52 through a line 49. The modulator valve 52 is communicated with a solenoid reducing valve 53 through a line 47. The solenoid reducing valve 53 is connected to the main line 45. The modulator valve 52 includes a spool 52a one end of which a pilot pressure is fed to through a pilot line 48. The pilot line 48 has a drain line 48a. The duty solenoid valve 60 to be controlled by the electric control unit 70 is provided in the drain line 48a. Changing the duty cycle of the duty solenoid valve 60 changes the pilot pressure, and the modulator valve 52 then develops a modifier pressure corresponding to the changed duty cycle of the duty solenoid valve 60. The modifier pressure is fed to a booster port 51a of the pressure regulator valve 51 through the line 49, so that the main line pressure changes according to the modifier pressure.

Accordingly, it will be seen that the pressure regulator valve 51 and the modulator valve 52 constitutes the regulator means 50 shown in FIG. 1. Also, it will be seen that the main line pressure providing the coupling pressure is regulated according to the duty cycle of the duty solenoid valve 60 which is controlled by the electric control unit 70.

In this embodiment, the hydraulic pressure sensor 61 is provided in the line 49 to detect the modifier pressure in the line 49.

Figure 3:
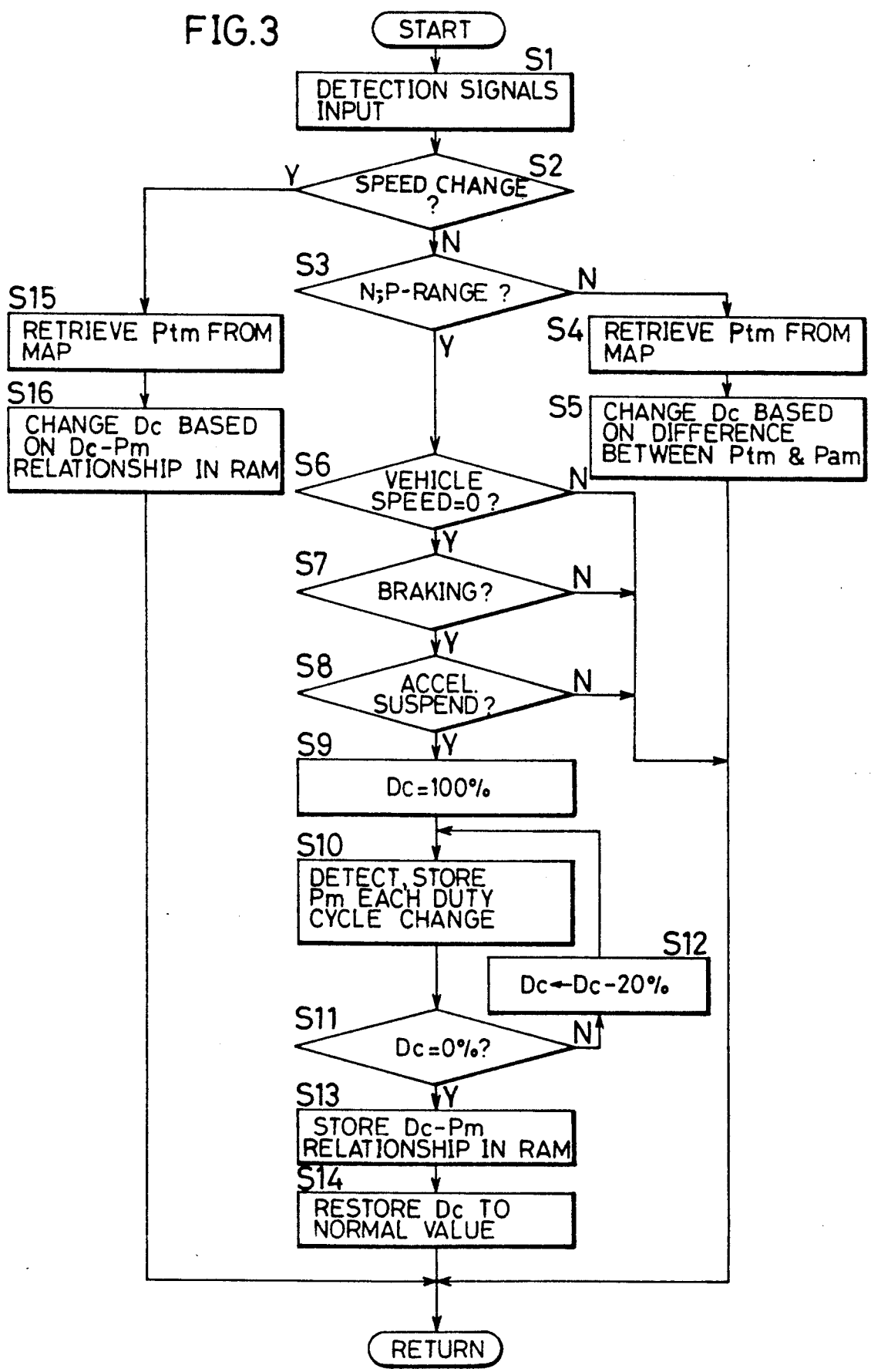
FIG. 3 is a flow chart showing a control operation of the automatic transmission.

FIG. 3 is a flowchart showing an operation routine for controlling the main line pressure. This control is carried out to develop such a line pressure as to assure coupling pressure necessary for each of various running conditions and smooth shifting.

This control has a feed-back control and an open control. Specifically, in a usual running state in which the vehicle is in running but the speed change is not practiced, the feed-back control is carried out in which the duty cycle Dc of the duty solenoid valve 60 is changed based on the difference between a target modifier pressure Ptm and an actual modifier pressure Pam detected by the hydraulic pressure sensor 61.

On the other hand, in a speed change state in which the gear speed is being changed, the open control is carried out in which the duty cycle Dc of the duty solenoid valve 60 is changed to a value which has been determined to develop a target modifier pressure Ptm based on a characteristic relationship curve stored in the memory means 72. The open control is carried out to attain a rapid response. A characteristic relationship curve is prepared to increase the accuracy of the open control.

Referring now to FIG. 3, in Step S1, an actual modifier pressure Pam, throttle opening, turbine revolution number, a selected range, vehicle speed state, brake state, and accelerator pedal state are input from the hydraulic pressure sensor 61, throttle opening sensor 81, turbine revolution number sensor 82, inhibitor switch 83, and switches 84, 85 and 86 respectively. Subsequently, this routine proceeds to Step S2 in which it is discriminated whether the gear speed is being changed. If the gear speed is not being changed, this routine proceeds to Step S3 in which it is discriminated whether the range is a non-running range, i.e., N-, or P-range.

If the transmission is not put in a non-running range, this routine proceeds to Steps S4 and S5 in which the feed-back control is carried out to regulate the line pressure in the usual running state. It should be noted that in the usual running state, the line pressure, i.e., the coupling pressure to the friction coupling member, is required to regulate according to the throttle opening and the revolution number of the turbine 4. Also, it should be noted that the modifier pressure has a fixed relationship to the line pressure. Accordingly, a number of target modifier pressures are calculated of developing line pressures corresponding to their respective throttle openings and turbine revolution numbers, and stored in a memory in advance in the form of a map. In Step S4, a target modifier pressure Ptm is retrieved from the map based on the input throttle opening and turbine revolution number. Thereafter, in Step S5, the duty cycle of the duty solenoid valve 60 is changed so that the actual modifier pressure Pam reaches the target modifier pressure Ptm. The duty cycle of the duty solenoid valve 60 is changed in a manner of PID control (Proportional, Integral, and Diffential control). The PID control is based on a difference between an actual modifier pressure Pam and a target modifier pressure Ptm.

If the transmission is put in a non-running range in Step S3, this routine proceeds to Step S6 in which it is discriminated whether the vehicle speed is zero. If the vehicle speed is zero, this routine proceeds to Step S7 in which it is discriminated whether braking is being effected. If braking is being effected, this routine proceeds to Step S8 in which it is discriminated whether the accelerator pedal is suspended. If the respective answers of Steps 6, 7 and 8 are NO, this routine returns to Step S1.

Figure 4:
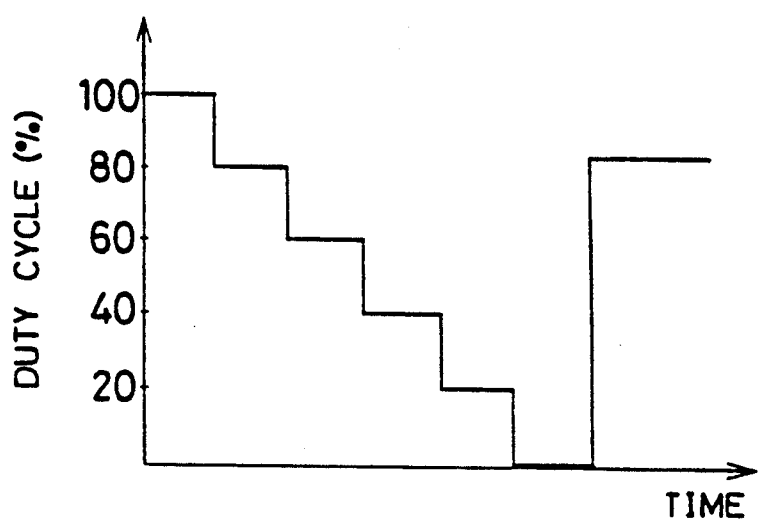
FIG. 4 is a time chart showing a change in the duty cycle of an duty solenoid valve provided in the automatic transmission relative to time.

If the respective answers of Steps 3, 6, 7 and 8 are YES, in other words, the vehicle is being stopped in a non-running range, and the braking is being effected, and the accelerator pedal is suspended, the operation is carried out of preparing a characteristic relationship curve of modifier pressures relative to duty cycles of the duty solenoid valve 60. The operation of making the characteristic relationship curve is executed in Steps 9, 10, 11, and 12 in which the duty cycle Dc is decreased from 100% to 0% by 20% as shown in FIG. 4, and a modifier pressure to each duty cycle is detected by the hydraulic pressure sensor 61, and then stored in a memory.

Specifically, in Step S9, the duty cycle Dc is set at 100%, and in Step S10 the modifier pressure is detected and stored in a memory. Thereafter, this routine proceeds to Step S11 in which it is discriminated whether the duty cycle Dc is 0%. If not 0%, this routine proceeds to Step S12 in which the duty cycle Dc is decreased 20%, and returns to Step S10 in which a modifier pressure relative to the 20%-decreased duty cycle is detected and stored in the memory. This operation is repeated until a modifier pressure relative to a duty cycle of 0% is detected and stored in the memory.

Figure 5:
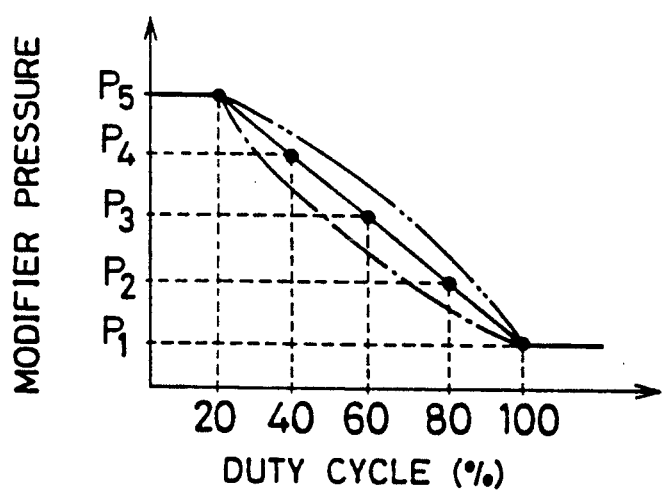
FIG. 5 is a graph showing characteristic relationships between modifier pressures and duty cycles of the duty solenoid valve.

When the modifier pressure relative to the duty cycle of 0% is detected and stored, or when the answer of Step S11 is YES, this routine proceeds to Step S13 in which a characteristic relationship curve of modifier pressures relative to duty cycles is stored in a RAM memory (not shown) provided in the electric control unit 70. As an example, a characteristic relationship curve is shown in FIG. 5. It should be noted that if the RAM memory bears a previously-prepared characteristic relationship curve, the previously-prepared characteristic relationship curve is renewed by a newly-prepared characteristic relationship curve. Subsequently, this routine proceeds to Step S14 in which the duty cycle is restored to a normal value set before Step S9.

If it is discriminated in Step S2 that the gear speed is being changed in Step S2, this routine proceeds to Steps S15 and S16 in which the open control is carried out to regulate the line pressure. In the gear speed change state, the line pressure is required to regulate according to the throttle opening. Also, the line pressure is required to regulate according to change way of changing the gear speed. For example, a target line pressure in a case of changing from a first gear speed to a second gear speed is different from that in another case of changing from the first gear speed to a third gear speed. Accordingly, target modifier pressure are calculated of developing line pressures corresponding to their respective throttle openings in each of a number of change ways, and stored in a memory in advance in the form of a map. In Step S15, a target modifier pressure Ptm is retrieved from the map based on the input throttle opening and speed change way. Subsequently, in Step S16, a duty cycle Dc corresponding to the target modifier pressure Ptm is determined based on the characteristic relationship curve which has been prepared in Steps S9-S12 and stored in the RAM memory in Step S13, and the duty solenoid valve 60 is controlled to attain the determined duty cycle Dc. Also, a backup map is stored in advance to make it possible to determine a duty cycle in an initial stage in which any characteristic relationship curve has not yet been prepared.

As described above, in this embodiment, when the transmission is put in the normal running state, the feedback control is carried out. Specifically, an actual modifier pressure is detected by the hydraulic pressure sensor 61, the duty cycle of the duty solenoid valve 60 is then changed so that the actual modifier pressure reaches a target modifier pressure. Thus, a proper coupling pressure is obtained.

In the speed change state which requires rapid response, on the other hand, the feed-back control is not carried out, but the open control is carried out. Specifically, a duty cycle Dc corresponding to a target modifier pressure Pm is determined based on a characteristic relationship curve prepared in advance, the duty solenoid valve 60 is controlled to attain the determined duty cycle Dc. The characteristic relationship curve is prepared when the vehicle is stopped in the non-running range, and braking is being effected, and the accelerator pedal is suspended. Accordingly, it could be seen that this open control is carried out with an increased accuracy.

More specifically, in the state that the vehicle is being stopped in a non-running range, and braking is being effected, and the accelerator pedal is suspended, even if the line pressure is changed, the engine and the vehicle will not receive any influence. Accordingly, it will be seen to be preferrable that when the vehicle is being stopped in the non-running range, and braking is being effected, and the accelerator pedal is suspended, a characteristic relationship curve is prepared by changing the duty cycle of the duty solenoid 60 from 100% to 0% stepwise, detecting a modifier pressure to each duty cycle by the use of the hydraulic pressure sensor 61. For example, if modifier pressures $P_1$-$P_5$ shown in FIG. 5 are obtained, a characteristic relationship curve will be a line connecting the modifier pressures $P_1$-$P_5$, that is, the solid line shown in FIG. 5. The characteristic relationship curve is stored in the RAM memory provided in the electric control unit 70.

However, it should be noted that the operation of preparing a characteristic relationship curve may be performed in other state than the state that the vehicle is being stopped in a non-running range, and braking is being effected, and the accelerator pedal is suspended, for example, a state that the vehicle is being stopped in a non-running range, or a state that the vehicle is running, but the vehicle is decelerated with the torque of the engine being not transmitted to the wheel.

In this embodiment, a characteristic relationship curve is prepared each time the vehicle is stopped in the non-running range, and braking is effected, and the accelerator pedal is suspended. Accordingly, even if the characteristic relationship varies with time as the alternate long and one short dash line, or alternate long and two short dashes line shown in FIG. 5, a fresh characteristic relationship curve following the variation is prepared and stored in a shortened time lag. Thus, an accurate characteristic relationship curve can be maintained at all times. Furthermore, when the gear speed is changed, the duty cycle corresponding to a target modifier pressure is determined based on a renewed characteristic relationship curve. Accordingly, the target modifier pressure can be assuredly attained even in the open control, and a proper line pressure or coupling pressure can thus be obtained.

To detect hydraulic pressure in connection with the coupling pressure to the friction coupling member, in this embodiment, the hydraulic pressure sensor 61 is provided in the line 49 to detect the modifier pressure. According to the present invention, however, a hydraulic pressure sensor may be provided in the main line 45 or the pilot line 48 to detect the main line pressure or the pilot pressure. It should be noted that if the line pressure or pilot pressure is used as hydraulic pressure in connection with the coupling pressure, the modifier pressure in Steps S4, S5, S10, S13, and S15 is replaced with the line pressure or pilot pressure.

What is claimed is:

1. An automatic transmission comprising:
   a transmission mechanism having a friction coupling member;
   a hydraulic control circuit for developing coupling pressure to the friction coupling member, the hydraulic control circuit having regulator means for regulating the coupling pressure with hydraulic pressure and a solenoid valve for controlling the hydraulic pressure of the regulator means, the solenoid valve having an opening position and a closing position, the hydraulic pressure being changed by changing a control amount of the solenoid valve;
   actuator means for actuating the solenoid valve from the opening position to the closing position and vice versa so as to change the control amount of the solenoid valve through a predetermined variation when the vehicle is in a predetermined state;
   hydraulic pressure sensor means for detecting hydraulic pressures changing with the control amounts;
   memory means for storing a characteristic relationship between the detected hydraulic pressures and the changed control amounts; and
   control means for controlling the solenoid valve based on the characteristic relationship stored in the memory means so that the regulator means regulates the coupling pressure to a desired value.

2. An automatic transmission according to claim 1 wherein the predetermined state is a state that the vehicle is being stopped.

3. An automatic transmission according to claim 1 wherein the predetermined state is a state that the vehicle is being stopped in a non-running range.

4. An automatic transmission according to claim 1 wherein the predetermined state is a state that the vehicle is being stopped in a non-running range with the braking being effected and the accelerator pedal being suspended.

5. An automatic transmission according to claim 1 wherein the actuator means is not put into operation at least when the automatic transmission is being shifted.

6. An automatic transmission according to claim 1 wherein the solenoid valve is a duty solenoid valve.

7. An automatic transmission according to claim 6 wherein the duty cycle of the duty solenoid valve is changed at a predetermined interval.

8. An automatic transmission according to claim 1 wherein the regulator means includes a pressure regulator valve and a modulator valve, the modulator valve being controlled by pilot pressure developed by the solenoid valve to develop modifier pressure, the pressure regulator valve being controlled by the modifier pressure to develop the line pressure providing the coupling pressure, the hydraulic pressure in connection with the coupling pressure is the modifier pressure.

9. An automatic transmission according to claim 1 wherein the regulator means includes a pressure regulator valve and a modulator valve, the modulator valve being controlled by pilot pressure developed by the solenoid valve to develop modifier pressure, the pressure regulator valve being controlled by the modifier pressure to develop the line pressure providing the coupling pressure, the hydraulic pressure in connection with the coupling pressure is the line pressure.

10. An automatic transmission according to claim 1 wherein the regulator means includes a pressure regulator valve and a modulator valve, the modulator valve being controlled by pilot pressure developed by the solenoid valve to develop modifier pressure, the pressure regulator valve being controlled by the modifier pressure to develop the line pressure providing the coupling pressure, the hydraulic pressure in connection with the coupling pressure is the pilot pressure.

11. An automatic transmission comprising:
a transmission mechanism having a friction coupling member;
a hydraulic control circuit for developing coupling pressure to couple the friction coupling member, the hydraulic control circuit having regulator means for regulating the coupling pressure and solenoid valve for controlling the regulator means, the solenoid valve being changeable from a maximum control amount to a minimum control amount to change hydraulic pressure in connection with the coupling pressure;
memory means for storing a characteristic relationship between the coupling pressure and the control amount of the solenoid valve;
actuator means for changing the solenoid valve from the maximum control amount to the minimum control amount and vice versa through a predetermined variation when the vehicle is in a predetermined state;
hydraulic pressure sensor means for detecting hydraulic pressures changed with control amounts;
renewing means for renewing a previously stored characteristic relationship in the memory means by a characteristic relationship recently obtained by actuation of the solenoid valve; and
control means for controlling the solenoid valve based on the recent characteristic relationship so that the regulator means regulates the coupling pressure to a desired value.

12. An automatic transmission comprising:
a transmission mechanism having a friction coupling member;
a hydraulic control circuit for developing coupling pressure to the friction coupling member, the hydraulic control circuit having regulator means for regulating the coupling pressure with the use of hydraulic pressure and a solenoid valve for controlling the hydraulic pressure of the regulator means, the solenoid valve having an opening position and a closing position, the hydraulic pressure being changed by changing the control amount of the solenoid valve;
actuator means for actuating the solenoid valve from the opening position to the closing position and vice versa so as to change the control amount of the solenoid valve through a predetermined variation when the actuation of the solenoid valve gives no influence to running of the vehicle;
hydraulic pressure sensor means for detecting hydraulic pressures changed with control amounts;
memory means for storing a characteristic relationship between the detected hydraulic pressures and the changed control amounts, and renewing the characteristic relationship each actuation of the solenoid valve; and
control means for controlling the solenoid valve based on the renewed characteristic relationship so that the regulator means regulates the coupling pressure to a desired value.

13. An automatic transmission comprising:
a transmission mechanism having a friction coupling member;
a hydraulic control circuit for developing coupling pressure to the friction coupling member, the hydraulic control circuit having regulator means for regulating the coupling pressure with the use of hydraulic pressure and solenoid valve for controlling the hydraulic pressure of the regulator means, the solenoid valve having an opening position and a closing position, the hydraulic pressure being changed by changing the control amount of the solenoid valve;
actuator means for actuating the solenoid valve from the opening position to the closing position and vice versa so as to change the control amount of the solenoid valve through a predetermined variation when the transmission is in a non-running state;
hydraulic pressure sensor means for detecting hydraulic pressure changed with control amounts;
memory means for storing a characteristic relationship between the detected hydraulic pressures and the changed control amounts, and renewing the characteristic relationship each actuation of the solenoid valve; and
control means for controlling the solenoid valve in an open control manner based on the renewed characteristic relationship so that the regulator means regulates the coupling pressure to a desired value, when the transmission is in a running state.

* * * * *